US012547332B2

(12) United States Patent
Mason et al.

(10) Patent No.: US 12,547,332 B2
(45) Date of Patent: Feb. 10, 2026

(54) REUSE OF BAD BLOCKS FOR TASKS IN A MEMORY SUB-SYSTEM

(71) Applicant: Micron Technology, Inc., Boise, ID (US)

(72) Inventors: Robert Mason, Boise, ID (US); Pitamber Shukla, Boise, ID (US); Scott Anthony Stoller, Boise, ID (US); Stuart A. Bell, Berthoud, CO (US); Dennis J. Borgonos, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 145 days.

(21) Appl. No.: 17/721,555

(22) Filed: Apr. 15, 2022

(65) Prior Publication Data

US 2023/0333762 A1    Oct. 19, 2023

(51) Int. Cl.
*G06F 3/06* (2006.01)
(52) U.S. Cl.
CPC ............ *G06F 3/064* (2013.01); *G06F 3/0619* (2013.01); *G06F 3/0653* (2013.01); *G06F 3/0679* (2013.01)
(58) Field of Classification Search
None
See application file for complete search history.

(56) References Cited

U.S. PATENT DOCUMENTS

| 11,132,247 B2 | 9/2021 | Rori et al. | |
|---|---|---|---|
| 2008/0002590 A1* | 1/2008 | Thomas | G06F 11/0781 370/242 |
| 2009/0106603 A1* | 4/2009 | Dilman | G06F 11/327 714/E11.002 |
| 2011/0314210 A1* | 12/2011 | Zorn | G06F 11/14 711/E12.007 |
| 2012/0151252 A1* | 6/2012 | Harris | G06F 12/08 714/6.13 |
| 2012/0203993 A1* | 8/2012 | Virgin | G06F 12/0246 711/E12.002 |
| 2015/0324264 A1* | 11/2015 | Chinnakkonda Vidyapoornachary | G06F 11/2084 714/6.11 |
| 2016/0117216 A1* | 4/2016 | Muchherla | G06F 11/30 714/6.11 |
| 2016/0224267 A1* | 8/2016 | Yang | G11C 29/76 |
| 2016/0328285 A1* | 11/2016 | Healy | G06F 3/064 |
| 2018/0189154 A1* | 7/2018 | Zhu | G06F 3/0659 |
| 2018/0269897 A1* | 9/2018 | Blaettler | H03M 7/4018 |
| 2018/0373644 A1* | 12/2018 | Linnen | G06F 11/1072 |
| 2019/0187933 A1* | 6/2019 | Lee | G11C 29/1201 |
| 2020/0185034 A1* | 6/2020 | Liikanen | G11C 16/10 |
| 2020/0210272 A1* | 7/2020 | Zhang | G06F 12/0246 |
| 2021/0141531 A1* | 5/2021 | Kim | G06F 3/0619 |
| 2021/0405888 A1* | 12/2021 | Park | G06F 11/1048 |

* cited by examiner

*Primary Examiner* — Jared I Rutz
*Assistant Examiner* — Alexander J Yoon
(74) *Attorney, Agent, or Firm* — Schwegman Lundberg & Woessner, P.A.

(57) ABSTRACT

A failure of a block among a set of blocks of a memory device of a memory sub-system is detected. Based on detecting the failure of the block, the block is evaluated for reuse. The block is designated for reuse based on a result of the evaluating of the block. The block is allocated to a task based on the block being designated for reuse.

20 Claims, 6 Drawing Sheets

REUSE OF BAD BLOCKS FOR TASKS IN A MEMORY SUB-SYSTEM

TECHNICAL FIELD

Embodiments of the disclosure relate generally to memory sub-systems and more specifically to reuse of bad blocks for tasks in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
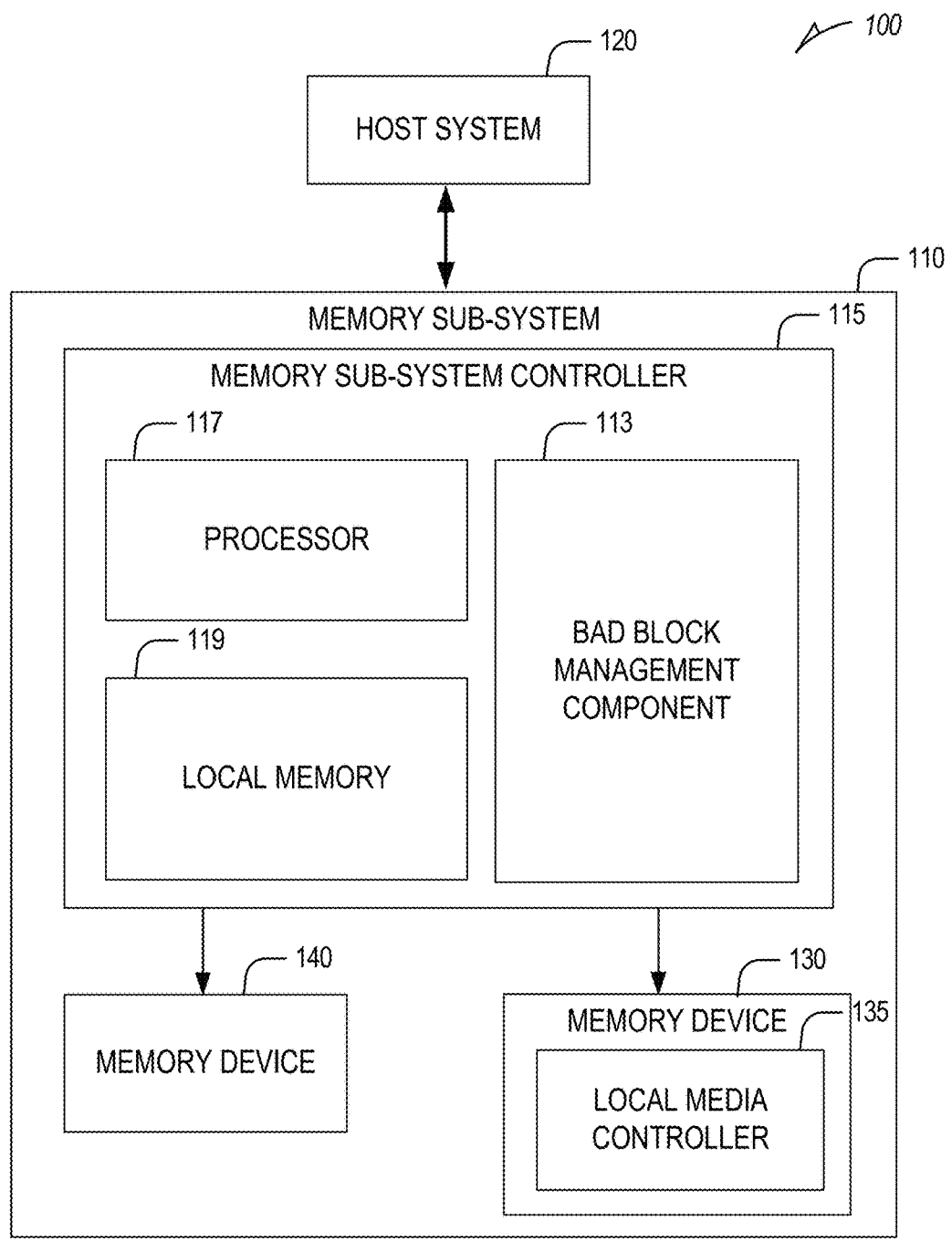
FIG. 1 is a block diagram illustrating an example computing system that includes a memory sub-system, in accordance with some embodiments of the present disclosure.

Aspects of the present disclosure are directed to reuse of bad blocks for tasks (e.g., storing user data or non-critical firmware tasks) in a memory sub-system. A memory sub-system can be a storage device (e.g., solid-state drive (SSD)), a memory module, or a combination of a storage device and memory module. Examples of other storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. Each of the non-volatile memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page.

For some types of memory devices (e.g., NAND), memory cells can be grouped into an erase unit, such as a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

A bad block (also referred to herein as "invalid block") hereinafter refers to block that is no longer reliable for storing or retrieving data, for example, due to a defect (e.g., manufacturing defect) or due to wear, and may incorrectly store bit values. An incorrect bit value is hereinafter referred to as an invalid bit. A grown bad block (GBB) hereinafter refers to a block being unreliable due to wear or defect. A grown bad block can be identified based on a threshold (e.g., bit error rates (BER) threshold).

Bad blocks can be present when a device is shipped or may develop over the lifetime of a device. For example, during manufacture of a NAND device, a certain number of blocks are factory generated bad blocks and are marked as factory bad blocks (FBB) an indication of which is typically stored within a dedicated region of the memory blocks. Memory blocks that are originally "good" valid blocks (i.e., reliable blocks) may eventually become GBBs as they wear out or defects occur during system usage.

Block defectivity is a critical consideration within a memory sub-system because complicated data protection schemes are required to prevent data loss. Since defectivity is often unpredictable, conventional solutions to this problem assume that any defect-related failure is permanent, and prevent additional failures by retiring the block, removing it from a list of locations to use for storing data. A traditional block-retirement policy in a memory sub-system uses a binary scheme for block retirement, where any failure due to a defect provides the basis for immediate and permanent retirement.

Aspects of the present disclosure address deficiencies of conventional block defectivity handling in memory sub-systems by evaluating the block failure and determining a retirement strategy over an extended period of time based on the evaluation. A bad block management component of the memory sub-system performs the evaluation by running multiple background scans on a block in response to detecting an initial failure of the block. In particular, in evaluating a failed block, the bad block management component performs a failure analysis on the block to determine a severity of the failure. If the failure is not severe, the bad block management component performs a failure verification to determine whether the failure is a hard or soft failure. If the block management component determines the failure is a soft failure, the bad block management performs a data integrity verification on the block. If the data integrity verification is successful, the bad block management component designates the block for reuse. If the bad block management component determines the failure is severe (e.g., based on determining the failure corresponds to a known defect), that the failure is a hard failure, if the data integrity check fails, or if a subsequent failure in the block is detected, the block is permanently retired and is never used again by the memory sub-system. This process allows the reuse of some bad blocks for both critical tasks (e.g., storing user data) and non-critical tasks (e.g., logging non-critical firmware data) without risking an additional Quality of Service (QOS) degradation beyond an original retirement event. In this context, non-critical refers to tasks that do not involve storing user data.

By running this form of scan over bad blocks, the memory sub-system can determine the severity of a block defect and elect to use the block for non-critical logging space thereby allowing for more efficient memory usage. This approach enables the memory sub-systems to recover at least a portion of bad blocks and therefore will enable a more adaptive block-retirement system policy. Overall, this approach to handling bad blocks greatly improves system yield by reducing the number of overprovisioned blocks without sacrificing system performance. This approach also allows for an increase in logging area by allowing soft failure locations to be used to store non-user data.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a serial advanced technology attachment (SATA) interface, a peripheral component interconnect express (PCIe) interface, USB interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 130 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controller 135 that operate in conjunction with memory sub-system controller 115 to execute operations on one or more memory cells of the memory devices 130.

As noted above, any one of the memory devices 130 or 140 can include arrays of memory cells grouped into blocks. Properly functioning blocks that store valid data are referred to as valid blocks. A grown bad block (GBB) can be detected in one of the memory devices 130 or 140 based on a failure or defect in the block that results in one or more bits being invalid. Hence, a GBB can be a failed or defective block. A GBB does not affect the performance of valid blocks because it is isolated from the common source line by a select transistor. However, the underlying data stored by the block can still be recovered and used by copying it to a replacement block.

The memory sub-system 110 also includes a bad block management component 113 that is responsible for managing, evaluating, and replacing bad blocks in the memory sub-system 110. Upon identifying a bad block (e.g., based on detecting a failure or based on a block being marked as a bad block), the bad block management component 113 performs an evaluation of the block to determine whether the block can be reused for tasks such as storing user data or storing non-critical data (e.g., logging of firmware data). If the evaluation produces a negative result, the bad block management component 113 permanently retires the block. If the evaluation produces a positive result, the bad block management component 113 designates the block for reuse and the block may accordingly be allocated to a task. Further details regarding the evaluation performed by the bad block management component 113 are discussed below in reference to FIGS. 2-5.

In some embodiments, the memory sub-system controller 115 includes at least a portion of the bad block management component 113. For example, the memory sub-system controller 115 can include a processor 117 (processing device) configured to execute instructions stored in local memory 119 for performing the operations described herein. In some embodiments, the bad block management component 113 is part of the host system 120, an application, or an operating system. In some embodiments, the local media controller 135 includes at least a portion of the bad block management component 113.

Figure 2:
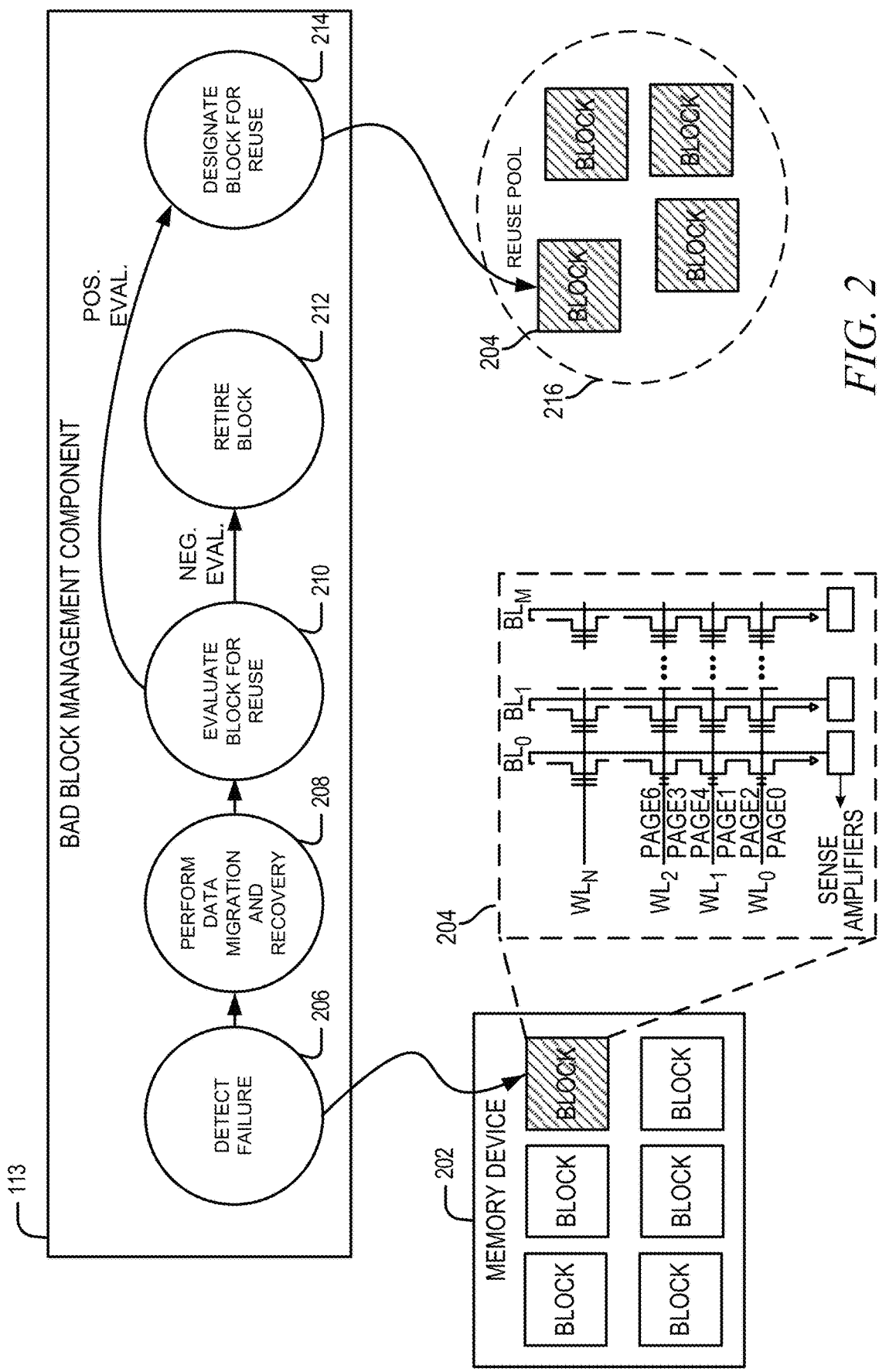
FIG. 2 is a conceptual diagram illustrating example interactions between components of the memory sub-system in managing bad blocks in a memory device, in accordance with some embodiments of the present disclosure.

FIG. 2 is a conceptual diagram illustrating example interactions between components of a memory sub-system in managing bad blocks, in accordance with some embodiments of the present disclosure. In the example illustrated in FIG. 2, the memory device 202 is an example memory device 130 in the example form of a NAND memory device including multiple memory blocks (e.g., memory block 204). A NAND memory block 204 includes a two-dimensional (2-D) array including pages (rows) and strings (columns).

A three-dimensional (3D) NAND-type flash memory device includes multiple planes, each of which includes one or more memory blocks 204. A string includes a plurality of memory cells connected in series. Each memory cell is used to represent one or more bit values (0 or 1). A single NAND flash cell includes a transistor that stores an electric charge on a memory layer that is isolated by oxide insulating layers above and below.

As shown, the bad block management component 113 detects a failure in the block 204 (at 206). The bad block management component 113 can detect the failure based on an indication of the failure of the block 204 received from the memory device 202. In response to the failure, the bad block management component 113 performs data migration and recovery on the block 204 (at 208). Rather than permanently retiring the block 204 based on the failure (as is performed in conventional handling of bad blocks), the bad block management component 113 evaluates the block 204 for reuse, for example, in performing tasks such as storing user data or executing non-critical firmware tasks (at 210). As will be discussed in further detail below, the evaluation of the block can be performed in one or more scans that include: a failure analysis to determine a severity level of the failure; a failure verification to classify the failure as a hard or soft failure; and a data integrity verification.

If the evaluation produces a negative result (e.g., any one or more of a determination that the failure of the block 204 has a high severity level, a classification of the failure of the block 204 as a hard failure, or an unsuccessful data integrity verification on the block 204), the bad block management component 113 permanently retires the block (at 212).

If the evaluation produces a positive result (e.g., a determination that the failure has a low severity level, a classification of the failure as a soft failure, and a successful data integrity verification on the block), the bad block management component 113 designates the block for reuse (at 214). As shown, for some embodiments, the bad block management component 113 may add the block 204 to a pool 216 of failed blocks that are designated for reuse.

Based on the block 204 being designated for reuse, the bad block management component 113 or another component of the memory sub-system can allocate the block 204 to a task such as storing user data or performing non-critical firmware task (e.g., storing non-user data such as firmware logging data) or even reuse to store user data. The particular task to which the block 204 is allocated may be based on the evaluation of the block 204. For example, the task may be based on any one or more of a criticality of task indicated for the block 204, a risk level associated with reuse of the block 204, a particular task, task type, or group of tasks for which the block 204 is designated based on the evaluation and a pool of blocks in which the block 204 belongs. The block may be permanently retired based on detecting a subsequent failure.

Figure 3:
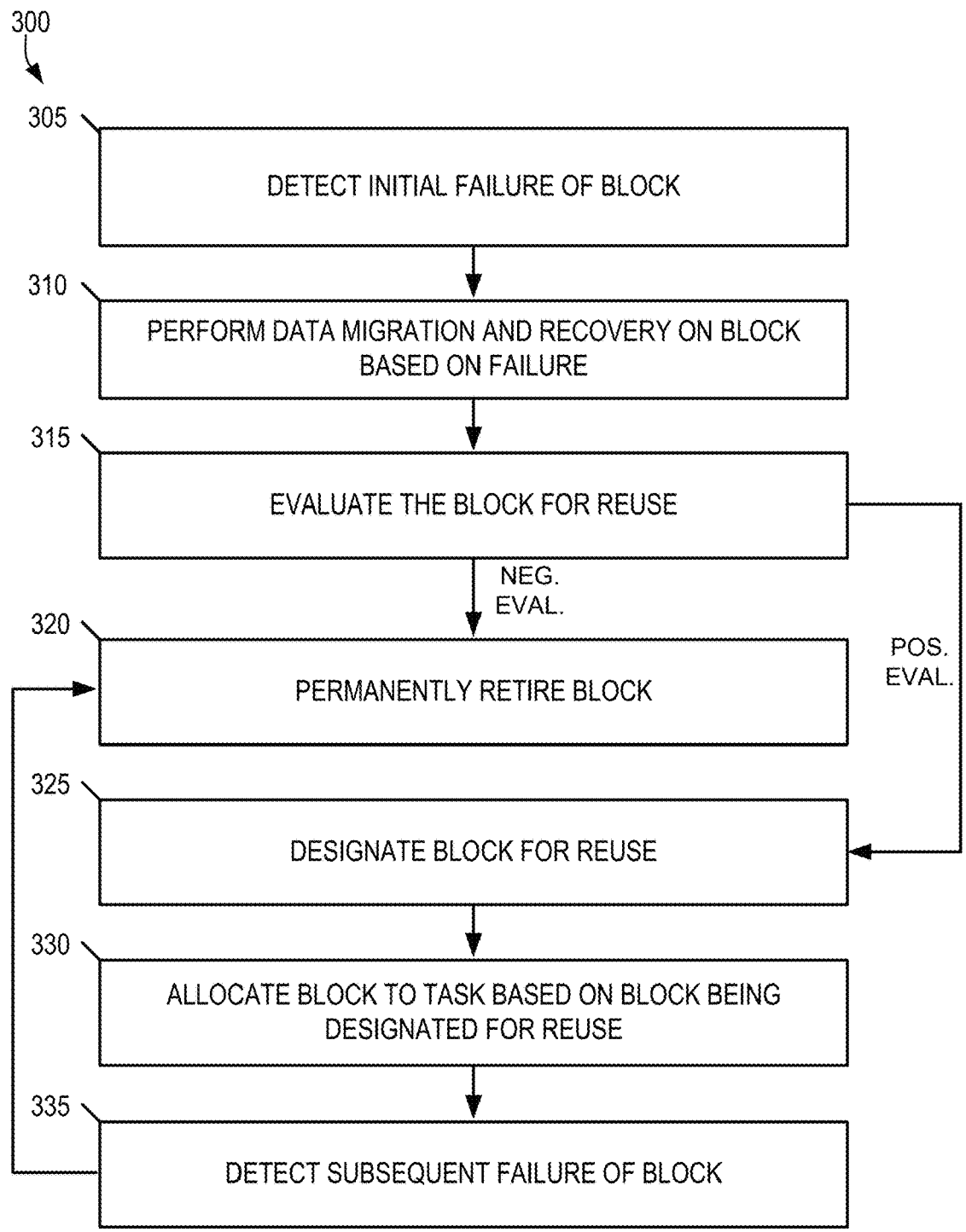
FIGS. 3 and 4 are flow diagrams illustrating an example method for managing bad blocks in a memory device, in accordance with some embodiments of the present disclosure.
Figure 4:
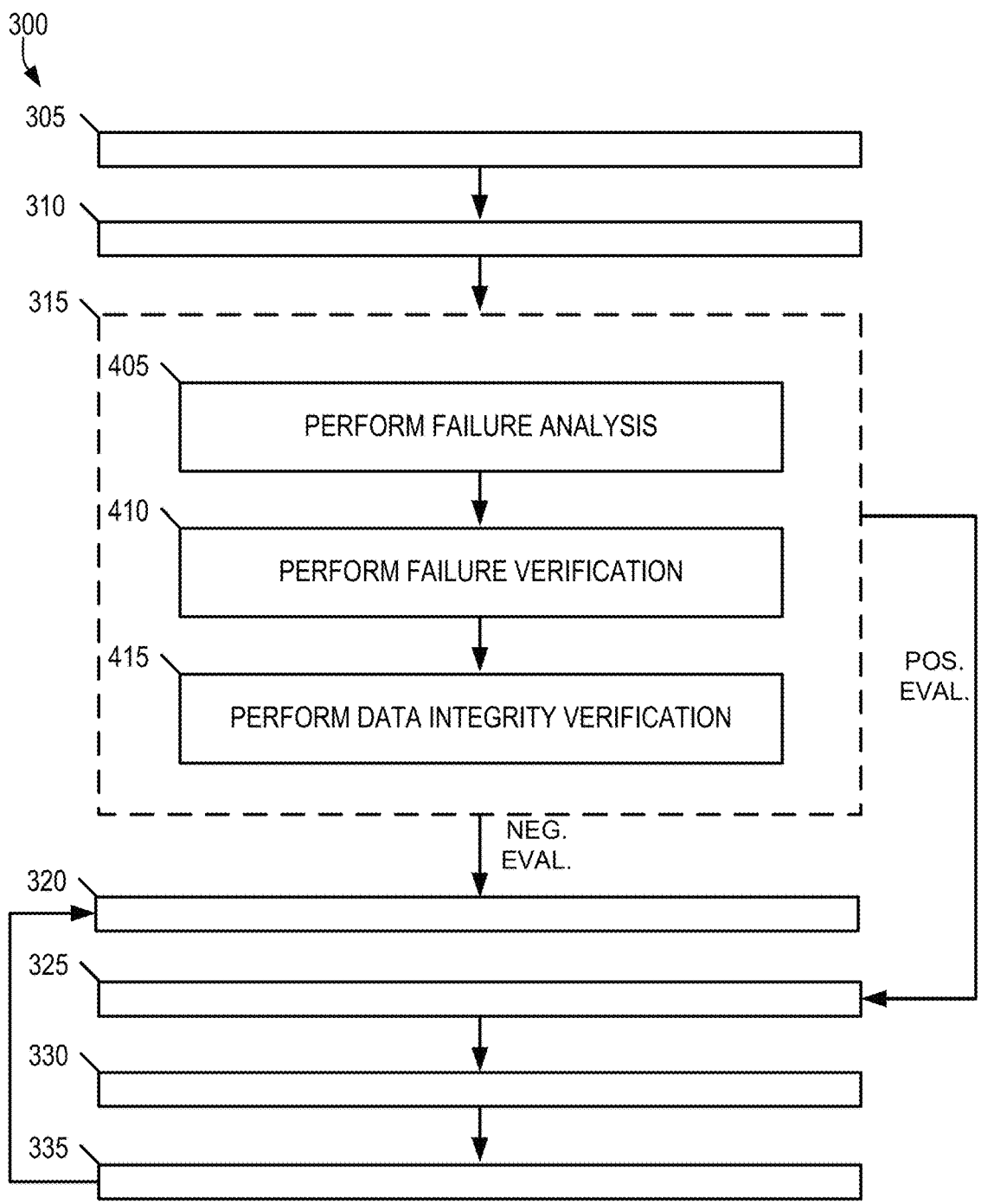

FIGS. 3 and 4 are flow diagrams illustrating an example method 300 for managing bad blocks (BBs) on a memory device (e.g., memory device 130), in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the bad block management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 300 begins at operation 305 where the processing device detects an initial failure of a block in a memory device (e.g., the memory device 130). The processing device can detect the failure based on an indication of the failure of the block received from the memory device. The failure can, for example, include or correspond to an event that causes the data in a block to become corrupt and/or unrecoverable or difficult to recover. Some example events could be strong or weak shorts between physical structures in the NAND device silicon (defects) or other types of intrinsic or extrinsic weaknesses in the cell. Another example could be premature degradation and wearout of the block in the memory device.

At operation 310, the processing device performs data migration and recovery on the block based on detecting the initial failure. In performing data migration and recovery, the processing device copies data stored in the block into the replacement block and remaps associations between the logical addresses previously mapped to physical addresses of the block. That is, the processing device remaps one or more logical addresses to one or more physical addresses of the replacement block. For example, the processing device can maintain a look-up table that includes address translations between LBAs and PBAs, and the processing device can update the look-up table to map LBAs corresponding to the data copied from the block to PBAs corresponding to the replacement block.

At operation 315, the processing devices evaluates the block for possible reuse despite the detected failure. The evaluation of the block may occur in one or more scans. For example, in evaluating the block for reuse, the processing device performs: a failure analysis to determine a severity level of the failure, a failure verification to classify the failure as a hard or soft failure; and a data verification check. In instances where multiple blocks fail at the same time, individual block evaluation is used to isolate the failure.

A result of the evaluation, whether positive or negative, determines whether the block is to be reused. For some embodiments, the evaluation produces a binary result (e.g., pass or fail). For some embodiments, the evaluation can produce a numerical result such as a score, which can, for example, indicate a level of risk associated with reuse of the block. The numerical result can be compared to a threshold or a range, which can, for example, be used to determine whether the result of the evaluation is positive or negative. In some embodiments, the numerical result can be determined based on an aggregate of numerical results (e.g., weights or scores) determined for one or more sub-evaluations. For example, a first numerical result may be determined based on a failure analysis, a second numerical result can be determined based on a failure verification, a third numerical result may be determined based on a data verification, and the first, second, and third numerical results can be aggregated to determine an overall numerical result for the evaluation. Further details regarding the evaluation performed by the processing device are discussed below in reference to FIG. 4.

Based on a negative result of the evaluation (e.g., one or more of: a determination that the failure of the block has a high severity level, a classification of the failure of the block as a hard failure, an unsuccessful data integrity verification on the block), the processing device permanently retires the block at operation 320. In permanently retiring the block, the processing device may update metadata associated with the block to mark the block as being retired, and based on the block being marked as retired, the block is no longer used by the memory sub-system to store data or for any other function. As an example of the updating the metadata, the processing device may access a table or other data structure (e.g., stored in local memory) that includes information regarding a status of each block in the memory device (e.g., retired, active, or limited use for non-critical tasks).

Based on a positive result of the evaluation (e.g., a determination that the failure has a low severity level, a classification of the failure as a soft failure, and a successful data integrity verification on the block), the processing device designates the block for reuse, at operation 325. In designating the block for reuse, the processing device may update metadata associated with the block to indicate the block as being available to be allocate to a task.

For some embodiments, the processing device designates the block as being generally available for reuse. For some embodiments, as part of designating a block for reuse, the processing device indicates a criticality level of tasks that the block can perform (e.g., critical or non-critical) determined based on the evaluation. For some embodiments, as part of designating the block for reuse, the processing device indicates a risk level associated with reusing the block that can be used by downstream processes to determine a task to which the block can be allocated. For some embodiments, the processing device designates the block for a specific task, type of task, or group of specific tasks, which may be determined based on the evaluation.

For some embodiments, the processing device may maintain one or more pools of failed blocks that have been deemed available for reuse, and in designating the block for reuse, the processing device adds the block to one such pool. Such a pool of blocks may correspond to a general pool of blocks for reuse or specific pools based on risk level of the blocks or a criticality of tasks the blocks can perform.

At operation 330, the processing device allocates the block to a task based on the block being designated for reuse. The task to which the block is allocated may be determined, for example, based on any one or more of a criticality level of task indicated for the block, a risk level associated with the block, a specific tasks, task type, or group of tasks to which the block is designated, or a pool of blocks in which the block is a member. As an example, the task may be storing user data and as such, the block may be allocated to a pool of blocks used for storing user data. In some instances, if the block is allocated for storing user data, additional restrictions (e.g., end of life degradation) can be imposed on the block to place a lower program erase cycle limit on the block than other blocks in the user data block pool. As another example, the task may be a non-critical firmware task such as logging non-critical data or storing back-up data. As yet another example, the block may initially be designated as a TLC block, but may be designated as an SLC block based upon a detected failure and evaluation. In another example, if the severity of the failure is determined to be very low the block could even be marked for re-use to store user data again.

For some embodiments, the task to which the block is allocated can be based on an overall numerical result (e.g., a score) of the evaluation (e.g., indicating a level of risk associated with reuse of the block) or any one or more intermediate numerical results corresponding to the failure analysis, failure verification, data integrity verification, or any other operations performed as part of the evaluation.

As shown, if a subsequent failure is detected in the block (at operation 335), the block may be permanently retired (at operation 320) upon further evaluation of the subsequent failure. It shall be appreciated that the operation 335 is included for completeness of the process, but may not be performed in every instance. That is, for a given block in which an initial failure is detected, a second failure may never again be detected during the lifetime of the system.

Further, it shall be appreciated that while the above description is directly applicable to GBBs, the method 300 can be equally applicable to FBBs as well. For example, to handle blocks that are marked as bad blocks at the initialization of the system (i.e., FBBs), the processing device does not perform operations 305 and 310. That is, rather than detecting a failure (operation 305) and performing data recovery and migration (operation 310), which is performed for GBBs, for FBBs, the processing device merely identifies a block that is marked bad, performs the evaluation at operation 315, and otherwise proceeds as indicated above.

As shown in FIG. 4, the method 300 may, in some embodiments, include operations 405, 410, and 415. Consistent with these embodiments, the operations 405, 410, and 415 can be performed as part of the operation 325 where the processing device evaluates the block for reuse. At operation 405, the processing device performs an initial failure analysis on the block to determine a severity level of the failure. For some embodiments, the initial failure analysis includes generating a first numerical result that indicates or can be used to determine the severity level of the failure. In performing the initial failure analysis, the processing device can collect and analyze threshold voltage (Vt) data (comprising one or more histogram or bitline Vt measurements) from the block to determine the severity of the failure. In some instances, the processing device may identify patterns in the Vt data that correspond to known defects with a known severity level. For some embodiments, the processing device identifies patterns using a stored mapping (e.g., a look-up table or other data structure) of patterns to known defects to which they correspond. For some embodiments, the processing devices uses a directed decision tree to identify a known defect in the block based on the Vt data.

For some embodiments, the processing device can use or include a machine learning component trained to identify known defects based on patterns in the Vt data. For example, a neural network or machine learning algorithm can be trained using a training set of data that includes data produced during manufacture of memory devices in which patterns of data are mapped to known defects in memory devices. The processing device can utilize a neural network trained thusly to identify such known defects from Vt data collected for the block as part of the failure analysis. The neural network can be updated over the lifetime of the memory sub-system via firmware updates.

Figure 5:
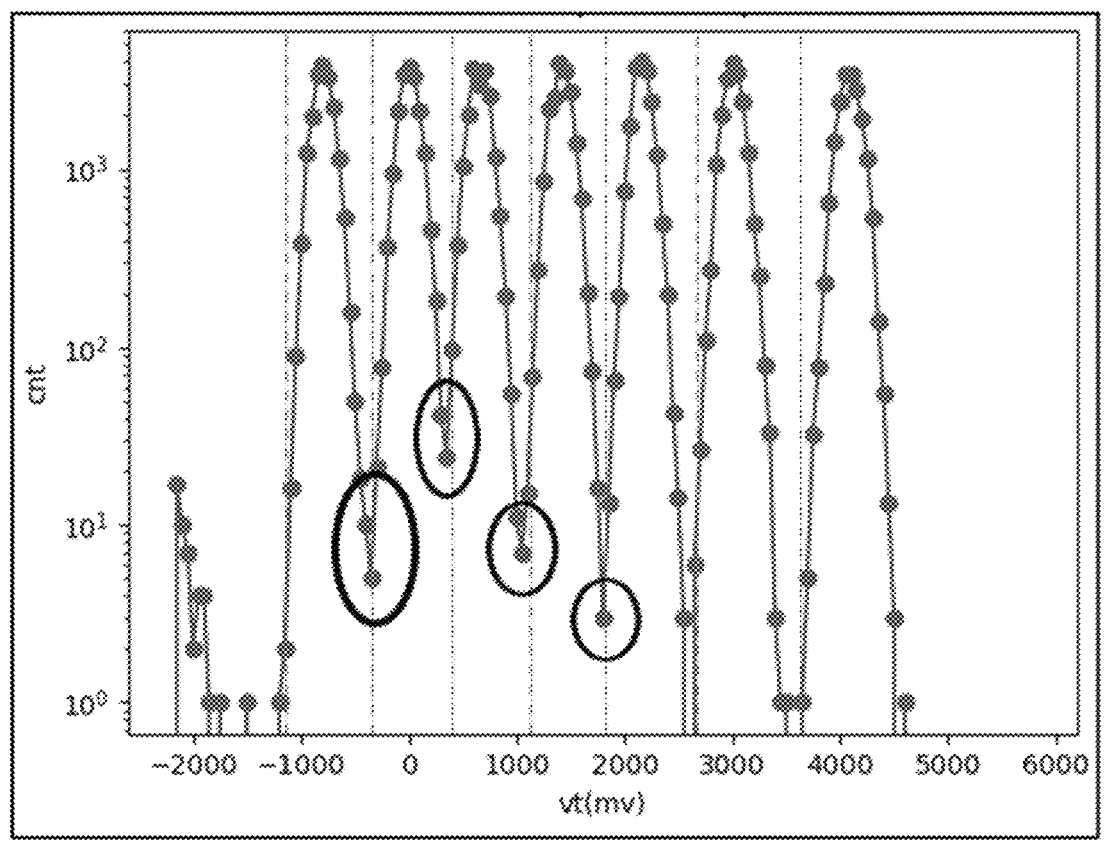
FIG. 5 is a graph of example threshold voltage data used to evaluate a bad block for reuse, in accordance with some embodiments of the present disclosure.

As an example, FIG. 5 shows a graph 500 with plotted Vt data corresponding to a known defect. As noted above, Vt from the block can be collected and analyzed as part of the failure analysis. From the Vt data, a read window budget (RWB) can be measured to evaluate whether the block can be reused based on a comparison with an allowable range. For the example block corresponding to the plotted Vt, evaluation would fail based on the lack of valley between L1-L4, and the block would be retired due to disturb risk, despite passing a program verify operation.

With returned reference to FIG. 4, if, in performing the initial failure analysis, the processing device determines a high severity level for the failure (e.g., based on a known defect), the method 300 moves to operation 320, where the processing device permanently retires the block.

Otherwise (e.g., if the processing device determines the failure has a low severity level), the method 300 proceeds to operation 410 where the processing device performs a failure verification on the block. In performing the failure verification, the processing device classifies the failure of the block as either a hard failure or a soft failure. As used in this context, a "hard failure" can refer to a repeated and consistent failure (e.g., a failure on every attempted write operation on the block) and a "soft failure" can refer to a failure that does not replicate or only periodically replicates. The failure verification can, in some embodiments, include determining a second numerical result or refining the first numerical result, either of which can be used as a basis for classifying the failure as a hard or soft failure. For some embodiments, the failure verification includes erasing and reprogramming the block with dummy data and performing a read verification (e.g., verifying that the dummy data remains programmed). If the erase or programming operations fail (e.g., a Program Status Fail (PSF) or Erase Status Fail (ESF)) the failure verification fails. Consistent with these embodiments, the failure verification fails if the read verification fails and conversely the failure verification passes if the read verification passes.

If the processing device determines the failure is a hard failure (e.g., a (PSF) or RWB failure), the method 300 moves to operation 320, where the processing device permanently retires the block. Otherwise, the method 300 proceeds to operation 415 where the processing device performs a data integrity verification on the block. The data integration verification comprises one or more intrinsic reliability tests on the block. The data integration verification can, for example, include applying read-hammers to a failure location (e.g., at various temperatures) within the block and verifying, based on applying the read-hammers to the failure location, that a RWB is within an allowable range. As further examples, the data integration verification can include a hot-E test or latent read-disturb test. As with the failure analysis and failure verification, the data integrity verification can include generating a third numerical result that indicates or can be used to determine an intrinsic reliability of the block.

If the data integration verification fails (e.g., based on a RWB or UECC failure), the method 300 moves to operation 320, where the processing device permanently retires the block. Otherwise, the method moves to operation 325 where the processing device designates the block for reuse.

As mentioned above, any one or more of the operations 405, 410, and 415 can include determining a numerical result, and the numerical result can be used to determine a success or failure of the underlying analysis or verification. For example, a first numerical result (e.g., score) can be determined based on the failure analysis that is indictive of the severity level of the failure. The first numerical result can be used to determine whether the failure is a high severity level or low severity level (e.g., by comparing the numerical value to a threshold where values below the threshold correspond to a low severity level and values at and above the threshold correspond to a high severity level), which can be used to determine whether the block is permanently retired or reused, and for what task. As another example, a second numerical result can be determined based on the failure verification, and the second numerical result can be used to determine whether the failure is a hard failure or soft failure (e.g., by comparing the numerical value to a threshold where values below the threshold correspond to a soft failure and values at and above the threshold correspond to hard failures). As yet another example, a third numerical result can be determined based on the data integrity check that is indicative of an intrinsic reliability of the block. The third numerical result can be compared to a threshold to determine whether the data integrity verification passes or fails (e.g., if the value is below the threshold the data integrity verification passes; otherwise it fails).

Any one or more of the first, second, or third numerical results can be combined to determine an overall numerical result of the evaluation, which can be used to determine whether the evaluation is positive or negative. In addition, once the block is designated for reuse, any one of more of the first, second, or third numerical result can be used as a basis for determining a specific task to which the block is allocated based on, for example, a criticality of the task.

Described implementations of the subject matter can include one or more features, alone or in combination as illustrated below by way of example.

Example 1 is a memory sub-system comprising: a memory device comprising a set of blocks; and a processing device, operatively coupled with the memory device, to perform operations comprising: detecting a failure of a block in the set of blocks; based on detecting the failure of the block, evaluating the block for reuse; based on a result of the evaluating of the block, designating the block for reuse; and allocating the block to a task based on designating the block for reuse.

Example 2 includes the memory sub-system of Example 1, wherein: the evaluating of the block comprises performing a failure analysis on the block to determine a severity level of the failure.

Example 3 includes the memory sub-system of any one or more of Examples 1 or 2, wherein performing the failure analysis comprises analyzing threshold voltage data to determine the severity of the failure.

Example 4 includes the memory sub-system of any one or more of Examples 1-3, wherein the performing of the failure analysis includes measuring a read window budget of the block.

Example 5 includes the memory sub-system of any one or more of Examples 1-4, wherein the performing of the failure analysis includes determining whether the failure resulted from a known defect.

Example 6 includes the memory sub-system of any one or more of Examples 1-5, wherein the evaluating of the block comprises: based on determining the failure has a low severity level, performing a failure verification on the block.

Example 7 includes the memory sub-system of any one or more of Examples 1-6, wherein the performing of the failure verification comprises reprogramming the block with dummy data.

Example 8 includes the memory sub-system of any one or more of Examples 1-7, wherein the performing of the failure verification comprises classifying the failure as a hard failure or a soft failure.

Example 9 includes the memory sub-system of any one or more of Examples 1-8, wherein: the evaluating of the block further comprises, based on a successful failure verification, performing a data integrity verification on the block.

Example 10 includes the memory sub-system of any one or more of Examples 1-9, wherein performing the data integrity verification on the block comprises: applying read-hammers to a failure location within the block; and verifying, based on applying the read-hammers to the failure location, that a read window budget is within an allowable range.

Example 11 includes the memory sub-system of any one or more of Examples 1-10, wherein the result of the evaluation comprises: a determination that the failure has a low severity level; a classification of the failure as a soft failure; and a successful data integrity verification on the block.

Example 12 includes the memory sub-system of any one or more of Examples 1-11, wherein: the failure is a first failure of the block; and the operations further comprise: detecting a second failure of the block; and based on detecting the second failure of the block, permanently retiring the block.

Example 13 includes the memory sub-system of any one or more of Examples 1-12, wherein: the block is a first block; and the operations further comprise: detecting a failure of a second block in the set of blocks; based on detecting the failure of the second block, evaluating the second block for reuse; and based on a result of the evaluating of the second block, permanently retiring the second block.

Example 14 includes the memory sub-system of any one or more of Examples 1-13, wherein the result of evaluating the second block includes at least one of: a determination that the failure of the second block has a high severity level; a classification of the failure of the second block as a hard failure; and an unsuccessful data integrity verification on the second block.

Example 15 includes the memory sub-system of any one or more of Examples 1-14, wherein the operations further comprise: based on detecting the failure of the block, performing data migration and recovery on the block.

Example 16 is method comprising: detecting a failure of a block of a memory device within a memory sub-system; based on detecting the failure of the block, evaluating, by a processing device, the block for reuse; based on a result of the evaluating of the block, designating the block for reuse; and allocating the block to a task based on designating the block for reuse.

Example 17 includes the method of Examples 16, wherein the evaluating of the block comprises: performing a failure analysis on the block to determine a severity level of the failure; based on determining the failure has a low severity level, performing a failure verification on the block; and performing a data integrity verification on the block based on a successful failure verification.

Example 18 includes the method of any one or more of Examples 16 or 17, wherein the result of the evaluation comprises: a determination that the failure has a low severity level; a classification of the failure as a soft failure; and a successful data integrity verification on the block.

Example 19 includes the method of any one or more of Examples 16-18, wherein: the failure is a first failure of the block; and the method further comprises: detecting a second failure of the block; and based on detecting the second failure of the block, permanently retiring the block.

Example 20 is a non-transitory computer-readable storage medium comprising instructions that, when executed by a processing device, configure the processing device to perform operations comprising: detecting a failure of a block of a memory device within a memory sub-system; based on detecting the failure of the block, evaluating the block for reuse; based on a result of the evaluating of the block, designating the block for reuse; and allocating the block to a task based on designating the block for reuse.

Figure 6:
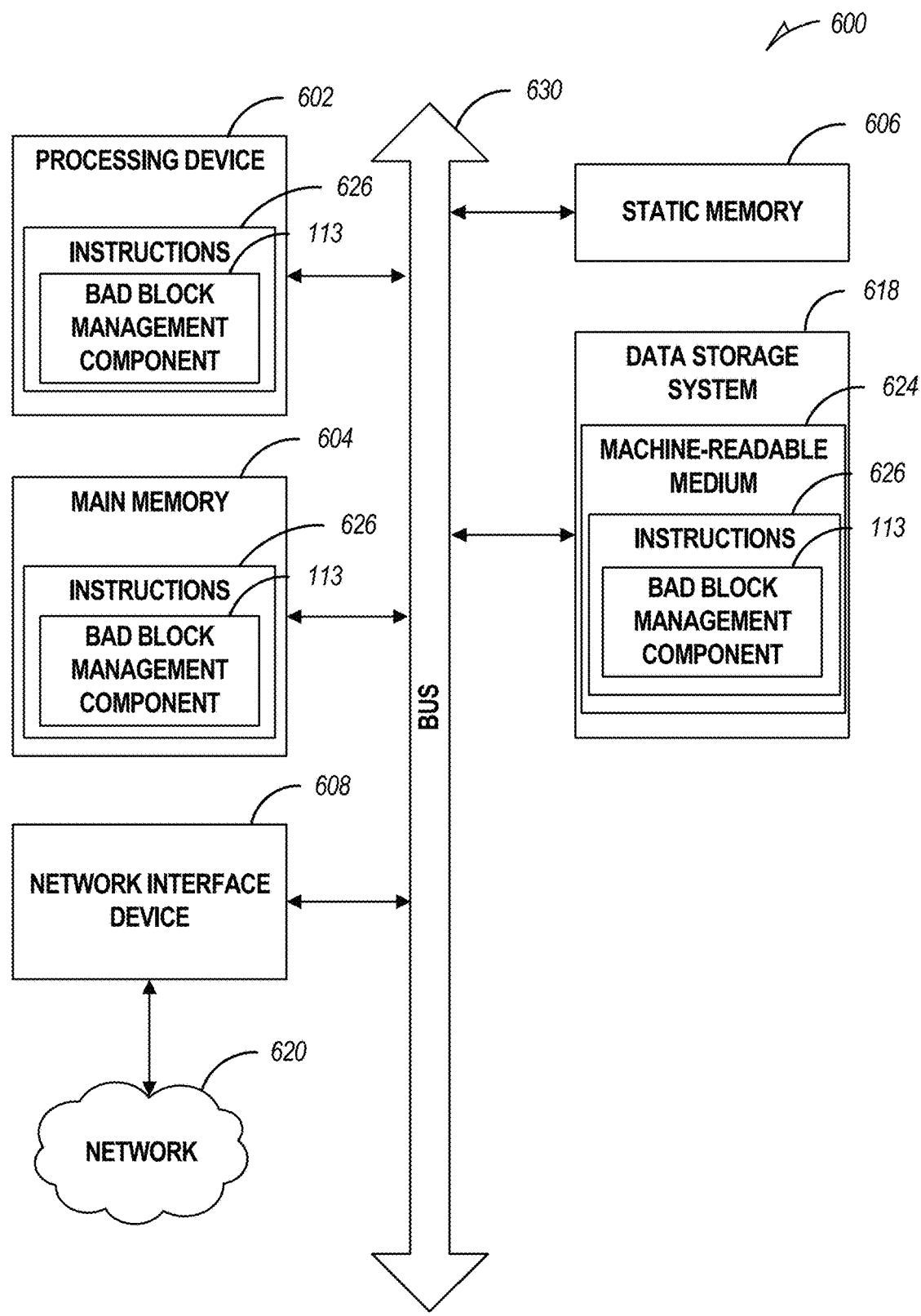
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the bad block management component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data destruction component (e.g., the bad block management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory device comprising a set of blocks; and
a processing device, operatively coupled with the memory device, to perform operations comprising:
detecting a first failure of a block in the set of blocks;
based on detecting the first failure of the block, evaluating the block for reuse, the evaluating of the block comprising determining a numerical result;
based on the numerical result determined from the evaluating of the block, designating the block for reuse, the designating of the block for reuse comprising adding the block to a pool of failed blocks that are designated for reuse, from among multiple pools of failed blocks designated for reuse, based on the numerical result;
based on the block being designated for reuse, determining a task, from among multiple tasks, to which the block is to be allocated based on the pool to which the block is added, the numerical result, and a criticality level of the task;
allocating the block to the task;
detecting a second failure of the block; and
based on detecting the second failure of the block, updating metadata to mark the block as permanently retired.

2. The memory sub-system of claim 1, wherein: the evaluating of the block comprises performing a failure analysis on the block to determine a severity level of the first failure, wherein the numerical result is based on the severity level of the first failure.

3. The memory sub-system of claim 2, wherein performing the failure analysis comprises analyzing threshold voltage data to determine the severity of the first failure.

4. The memory sub-system of claim 2, wherein the performing of the failure analysis comprises measuring a read window budget of the block.

5. The memory sub-system of claim 2, wherein the performing of the failure analysis comprises determining whether the first failure resulted from a known defect.

6. The memory sub-system of claim 2, wherein the evaluating of the block comprises: based on determining the first failure has a low severity level, performing a failure verification on the block.

7. The memory sub-system of claim 6, wherein the performing of the failure verification comprises erasing and reprogramming the block with dummy data.

8. The memory sub-system of claim 6, wherein the performing of the failure verification comprises classifying the first failure as a hard failure or a soft failure.

9. The memory sub-system of claim 6, wherein:
the evaluating of the block further comprises, based on a successful failure verification, performing a data integrity verification on the block.

10. The memory sub-system of claim 9, wherein performing the data integrity verification on the block comprises:
applying read-hammers to a failure location within the block; and
verifying, based on applying the read-hammers to the failure location, that a read window budget is within an allowable range.

11. The memory sub-system of claim 1, wherein the result of the evaluation comprises: a determination that the first failure has a low severity level; a classification of the first failure as a soft failure; and a successful data integrity verification on the block.

12. The memory sub-system of claim 1, wherein the operations further comprise:
identifying the block as a bad block based on detecting the first failure of the block.

13. The memory sub-system of claim 1, wherein:
the block is a first block; and
the operations further comprise:
detecting a failure of a second block in the set of blocks;
based on detecting the failure of the second block, evaluating the second block for reuse; and
based on a result of the evaluating of the second block, permanently retiring the second block.

14. The memory sub-system of claim 13, wherein the result of evaluating the second block comprises at least one of:
a determination that the failure of the second block has a high severity level;
a classification of the failure of the second block as a hard failure; and
an unsuccessful data integrity verification on the second block.

15. The memory sub-system of claim 13, wherein permanently retiring the second block comprises updating metadata associated with the second block to mark the block as being retired.

16. A method comprising:
detecting a first failure of a block of a memory device within a memory sub-system;
based on detecting the first failure of the block, evaluating, by a processing device, the block for reuse, the evaluating of the block comprising determining a numerical result;
based on the numerical result determined from the evaluating of the block, designating the block for reuse, the designating of the block for reuse comprising adding the block to a pool of failed blocks that are designated for reuse, from among multiple pools of failed blocks designated for reuse, based on the numerical result;
based on the block being designated for reuse, determining a task, from among multiple tasks, to which the block is to be allocated based on the pool to which the block is added, the numerical result and a criticality level of the task;
allocating the block to the task;
detecting a second failure of the block; and
based on detecting the second failure of the block, updating metadata to mark the block as permanently retired.

17. The method of claim 16, wherein the evaluating of the block comprises: performing a failure analysis on the block to determine a severity level of the first failure, wherein the numerical result indicates the severity level of the first failure; based on determining the first failure has a low severity level, performing a failure verification on the block; and performing a data integrity verification on the block based on a successful failure verification.

18. The method of claim 16, wherein the result of the evaluation comprises: a determination that the first failure has a low severity level; a classification of the first failure as a soft failure; and a successful data integrity verification on the block.

19. The method of claim 17, further comprising identifying the block as a bad block based on detecting the first failure of the block.

20. A non-transitory computer-readable storage medium comprising instructions that, when executed by a processing device, configure the processing device to perform operations comprising:
detecting a first failure of a block of a memory device within a memory sub-system;
based on detecting the first failure of the block, evaluating the block for reuse, the evaluating of the block comprising determining a numerical result;
based on the numerical result determined from the evaluating of the block, designating the block for reuse, the designating of the block for reuse comprising adding the block to a pool of failed blocks that are designated for reuse, from among multiple pools of failed blocks designated for reuse, based on the numerical result;
based on the block being designated for reuse, determining a task, from among multiple tasks, to which the block is to be allocated based on the pool to which the block is added, the numerical result and a criticality level of the task;
allocating the block to a task;
detecting a second failure of the block; and
based on detecting the second failure of the block, updating metadata to mark the block as permanently retired.

* * * * *